(12) United States Patent
Forestiero et al.

(10) Patent No.: US 6,323,640 B1
(45) Date of Patent: Nov. 27, 2001

(54) ROLLING BEARING UNIT WITH A ROTATING SPEED MEASURING DEVICE

(75) Inventors: Daniele Forestiero, Airasca To; Angelo Vignotto, Turin, both of (IT)

(73) Assignee: SKF Industrie S.p.A., Turin (IT)

(*) Notice: Subject to any disclaimer, the term of this patent is extended or adjusted under 35 U.S.C. 154(b) by 0 days.

(21) Appl. No.: 09/232,335

(22) Filed: Jan. 15, 1999

(30) Foreign Application Priority Data

Jan. 16, 1998 (IT) ................................. TO98A0035

(51) Int. Cl.[7] .............................. G01P 3/487; G01P 3/44; F16C 19/52
(52) U.S. Cl. ..................... 324/174; 324/207.25; 384/448
(58) Field of Search ................................ 324/173, 174, 324/207.25, 207.22; 384/448

(56) References Cited

U.S. PATENT DOCUMENTS

| 4,502,739 | 3/1985 | Bildtsen et al. . |
| 4,856,916 | 8/1989 | Ito et al. . |
| 5,139,425 | 8/1992 | Daviet et al. . |
| 5,454,724 | 10/1995 | Kloeppel et al. . |
| 5,567,058 | 10/1996 | Morita et al. . |
| 5,575,568 | 11/1996 | Rigaux et al. . |
| 5,695,289 | * 12/1997 | Ouchi et al. ........................ 324/174 |
| 5,863,135 | 1/1999 | Flander . |
| 5,969,518 | * 10/1999 | Merklein et al. ..................... 324/173 |

FOREIGN PATENT DOCUMENTS

| 42 31 033 | 8/1993 | (DE) . |
| 0 005 707 | 12/1979 | (EP) . |
| 0 475 841 B1 | 3/1992 | (EP) . |
| 0 607 719 | 7/1994 | (EP) . |
| 0 675 364 | 10/1995 | (EP) . |
| 0 681 185 | 11/1995 | (EP) . |
| 0 726 468 | 8/1996 | (EP) . |
| 0 875 700 A2 | 11/1998 | (EP) . |
| 63 043067 | 2/1988 | (JP) . |
| A-63 043067 | 2/1988 | (JP) . |
| 7-127647 | 5/1995 | (JP) . |

* cited by examiner

Primary Examiner—Walter Snow
(74) Attorney, Agent, or Firm—Merchant & Gould P.C.

(57) ABSTRACT

A rolling bearing unit for the hub of a vehicle wheel has an outer rotating race (10), a radially inner stationary race (11), a sealing device (16) between the races (10, 11), and a device for measuring the rotating speed of the outer race (10). The measuring device has an encoder wheel (13) in the form of a radially oriented annular disc of magnetised plastic or rubber material. The rolling bearing has a metallic annular insert (14) adapted for fixing the encoder wheel (13) to the outer race (10); the insert (14) forms: an outer cylindrical portion (14a) for forcefully fitting to an outer surface (10a) of the outer race (10); a radial wall portion (14b, 14d) that concurs in forming an annular seat for accommodating the encoder wheel, and that extends radially inwardly so as to co-operate with the sealing device (16) to close the gap between the races (10, 11); and a joining portion (14c) between the outer cylindrical portion (14a) and the radial wall portion (14b, 14d), on which an axial thrust is applied for performing the force fitting.

12 Claims, 2 Drawing Sheets

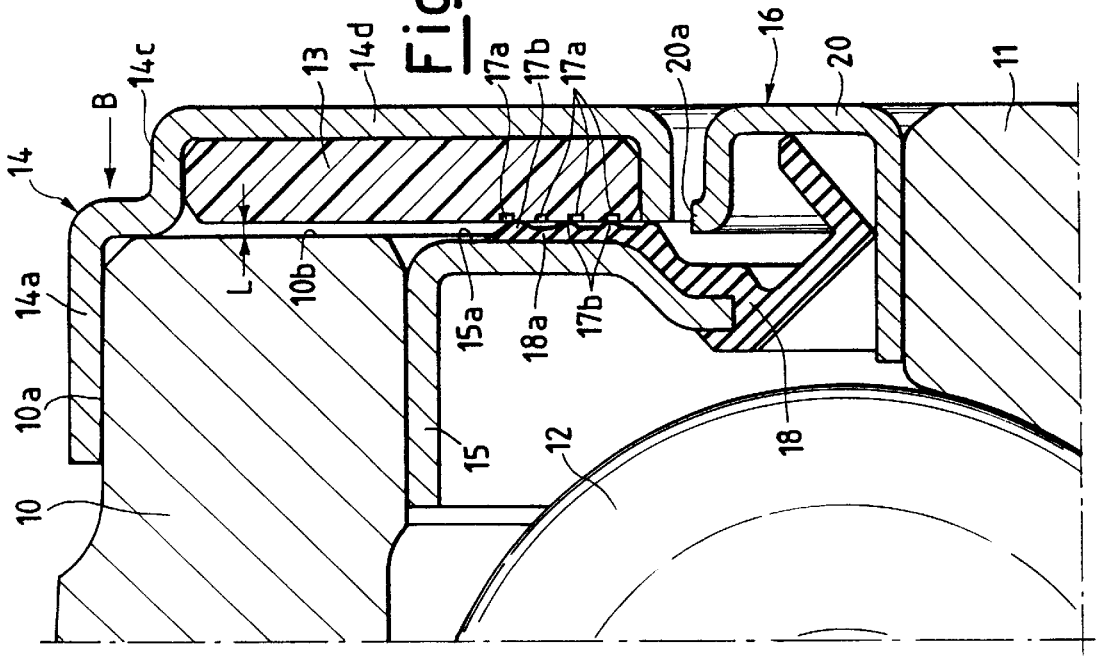
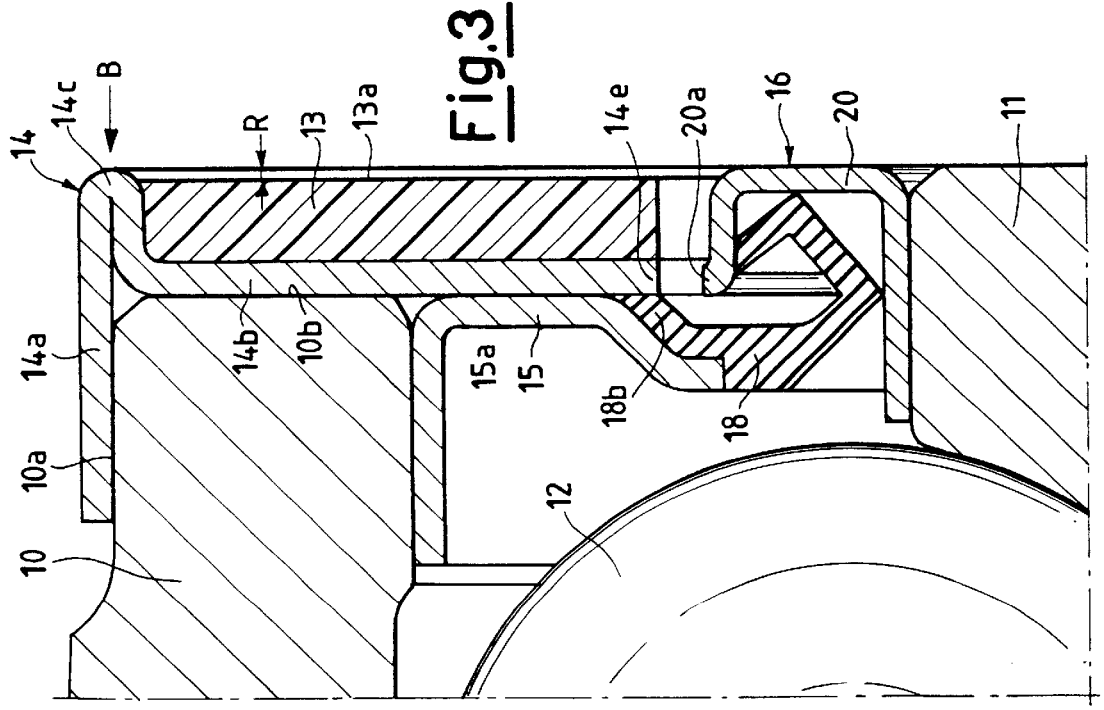

ROLLING BEARING UNIT WITH A ROTATING SPEED MEASURING DEVICE

The present invention refers to a roller bearing unit, in particular for the hub of a vehicle wheel, of the kind equipped with a sealing device and a device for measuring the rotating speed of the outer race.

Known measuring devices of the aforementioned type comprise an encoder wheel in the form of an annular disc of magnetised plastic or rubber material, which is rotatably secured to the rotating ring of the bearing. In some well-known types of device, the encoder wheel is forcefully fitted onto the rotating ring of the bearing or onto an element fixedly connected to it. It has however been found that encoder wheels of this type do not stand up very well to the stress to which they are subjected when they are forcefully fitted; furthermore, encoder wheels fitted in this way are exposed to the action of external contaminating agents such as water, dust, mud, metal particles from nearby brake devices etc; when said contaminating agents come into contact with said encoder wheels their performance tends to be impaired and the signal produced by a sensor which picks up variations in magnetic flow generated by the rotating encoder wheel can be adversely affected.

In other well-known types of device, such as that described in Italian patent application No. TO97A000371 (not yet available to the public as of the date of the present application) the encoder wheel is integrated into the sealing device of the bearing unit. While this kind of alternative presents certain advantages in some respects, the encoder wheel is however fitted in such a way as to present a restricted surface for the sensor to read.

An aim of the present invention is to achieve a robust, reliable arrangement which ensures that the encoder wheel does not risk being damaged during assembly, transport or use.

Another aim of the present invention is to achieve an arrangement of reduced overall dimensions, housing the encoder wheel between the axial dimensions of the bearing unit.

Another aim of the present invention is to obtain maximum intensity from the magnetic field generated by the encoder wheel, and to obtain a larger reading surface for the sensor in use facing the encoder wheel.

Another aim of the present invention is to propose a method which can also be applied to conventional bearing units, without having to modify them in order to mount an encoder wheel onto said conventional bearing units.

A further aim of the present invention is to achieve an arrangement which protects the magnetised wheel from sudden extreme changes in temperature caused by vehicle brake devices located near the hub.

These and other objectives and advantages, which will be better understood hereinafter, are achieved according to the present invention by a roller bearing unit, in particular for the hub of a vehicle wheel, the bearing comprising a radially outer rotating race, a radially inner stationary race, a sealing device between said races and a device for measuring the rotating speed of the outer race, wherein said measuring device comprises an encoder wheel in the form of a radially oriented annular disc of magnetised plastic or rubber material, characterised in that the bearing comprises a metallic annular insert adapted for fixing the encoder wheel to the bearing outer race, said insert forming: an outer cylindrical portion for forcefully fitting to an outer surface of the outer race; a radial wall portion concurring in forming an annular seat for accommodating the encoder wheel, said wall portion extending radially inwardly so as to co-operate with said sealing device to close the gap between said races; a portion joining said outer cylindrical portion and said radial wall portion, said joining portion being the part on which an axial thrust is exerted for performing said force fitting.

There will now be described the structural and functional characteristics of some preferred but not limiting embodiments of the bearing unit according to the invention, reference being made to the accompanying drawings, in which:

FIGS. 3 and 4 are views similar to FIG. 2, showing relevant modified forms of the encoder wheel according to the present invention.

Figure 1:
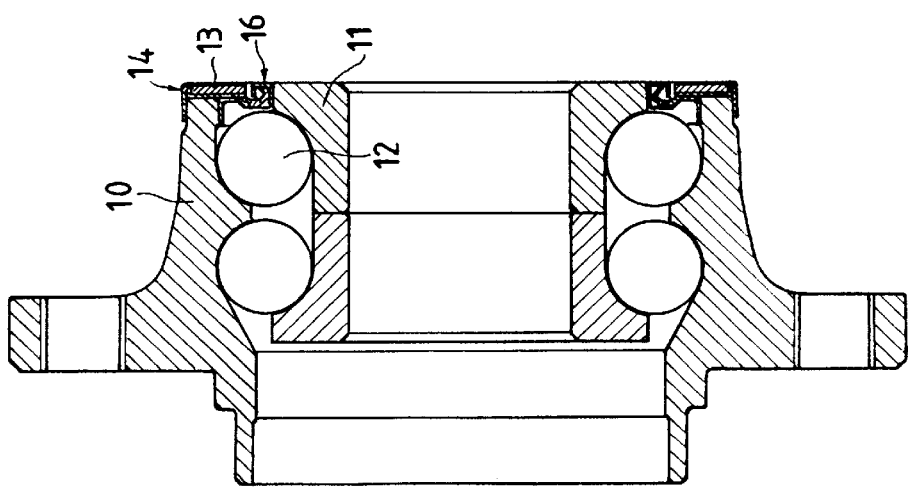
FIG. 1 is an axial sectional view of a bearing unit provided with an encoder wheel according to the present invention.
Figure 2:
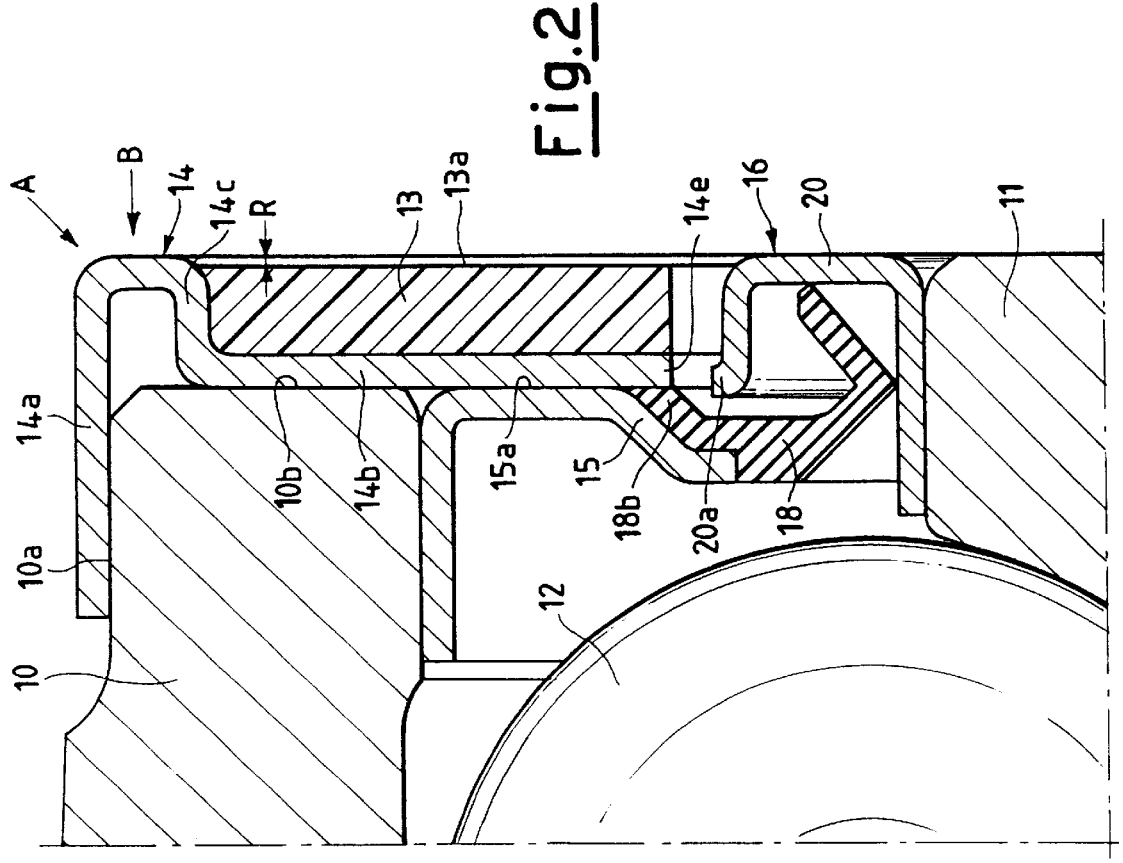
FIG. 2 is a view, on an enlarged scale, of the detail of the encoder wheel shown in FIG. 1 in a relevant first preferred embodiment

With reference to FIGS. 1 and 2, a bearing unit for the hub of a vehicle wheel comprises a radially outer rotating race 10, a radially inner stationary race 11, and two series of rolling elements 12, in this example spheres, interposed between the races 10 and 11. The bearing unit is provided with a measuring device for measuring the rotating speed of the outer race 10, the measuring device comprises an encoder wheel 13, mounted on the rotating race, and a sensor (not illustrated) facing the encoder wheel and mounted on a fixed wall of the vehicle.

The encoder wheel 13 is a radially oriented annular disc made of plastic or magnetised rubber with alternating polarities around the circumference and mounted on the axially inner side of the outer race 10.

With particular reference to FIG. 2, the encoder wheel 13 is vulcanised on a substantially annular metallic insert 14 the shape of which in axial section is duly profiled so as to show an external cylindrical portion 14a and an inner radial wall 14b, joined by an elbow portion 14c which extends axially towards the inner side of the vehicle. The radial wall 14b and the joining portion 14c show an annular seat which houses the encoder wheel.

The elbow portion 14c extends axially by a minimum distance of R with regard to the axially inner side 13a of the encoder wheel 13 to protect said encoder wheel from any eventual shocks caused, for example, by grit which might strike the encoder wheel during use (according to the direction indicated by arrow A), and to provide an axially extending surface on which to exert an axial thrust to mount the encoder wheel on the bearing unit, according to the direction indicated by arrow B. In other words, the annular seat in which the encoder wheel is housed has an axial dimension exceeding that of the encoder wheel.

The encoder wheel vulcanised on the insert 14 is mounted on the outer rotating race 10 fitting the cylindrical portion 14a around the outer cylindrical surface 10a of the outer rotating race 10, and pushing axially against the elbow portion 14c until the radial wall 14b of the insert 14 abuts against the axially outer side 10b of the outer race 10 and against a radial wall 15a of a shield 15 which forms part of a sealing device indicated in its entirety with 16, which hermetically seals the gap between the outer race 10 and the inner race 11.

With reference to FIG. 3 a variation is illustrated which differs from FIG. 2 in that the elbow portion takes up less space in the radial dimension in order to increase the surface of the encoder wheel and thus optimise the reading space for the sensor (not illustrated) facing the encoder wheel.

With reference to FIG. 4, the annular insert 14 which supports the encoder wheel 13 is made in such a way as to provide total external protection for the encoder wheel. With this aim, the insert forms a seat 14d with an axial section in the form of a C, congruent with the outline of the encoder wheel. When the encoder wheel is made in this form, in plastic or magnetised rubber material, it can still be vulcanised to the insert 14 and magnetised together with the insert, as in the previous examples, or it can be magnetised separately and thus simply fitted into the seat made up of the part 14d of the metallic insert 14 and locked onto the outer race 10 on which the insert 14 is forcefully fitted.

The above-mentioned variation, which provides for separate magnetisation, has an advantage in that it permits improved magnetisation which is also simpler from a practical point of view in comparison with that obtained by magnetising an encoder wheel already vulcanised in an insert. It is preferable that insert 14 is made of non-magnetic metal, for example non-magnetic steel or aluminium.

In the case that the encoder wheel is not vulcanised to insert 14, the encoder wheel is locked rotationally on to its own support by means of axial irregularities, in the form of bumps or grooves, at the interface between the encoder wheel and the radial surface against which it abuts when the insert 14 is forcefully fitted onto the rotating ring 10 of the bearing unit. In the example illustrated in FIG. 4, the above-mentioned irregularities are achieved in the form of axial grooves 17a on the axially outer side, and more exactly on the radially inner part of this side, of the encoder wheel 13, and bumps 17b in a radially outwardly directed extension 18a of the rubber which forms lip 18 of the sealing device 16, of a well-known type. The irregularities 17a, 17b formed in the two contacting bodies should preferably be of different geometric shapes, so that when force fitting is performed the two elements which come into contact with each other yield elastically at certain points. For example, bumps could be made around the circumference of the extension 18a while spiral grooves could be made in the encoder wheel, or vice versa, so as to impede relative rotation between these two elements. The rubber lip, being devoid of metallic particles, is more yieldable that the magnetised rubber from which the encoder wheel is made, so that in this case the extension 18a is the more elastically yieldable element.

It will be obvious to experts in the relevant sector that numerous modifications can be made with a view to using elastic yieldability to block the encoder wheel with regard to the rotating ring of the bearing unit. For example, axial protuberances could be made in the encoder wheel and/or on the radial wall 15a of the metallic shield 15 in the case that the lip 18 does not have the extension 18a illustrated in FIG. 4; in such a case the magnetised rubber of the encoder wheel will obviously yield against the metallic shield 15.

The arrangement illustrated in FIG. 4 also, however, presents certain advantages due to the fact that the extension of the lip 18, apart from impeding the rotation of the encoder wheel in the insert 14, creates a seal with regard to the infiltration of water and other contaminating agents as it prevents them from reaching the encoder wheel 13 by passing between the insert 14 and the shield 15.

Again with reference to FIG. 4, the connection between the encoder wheel 13 and the support insert 14 should be such that it does not produce any yield in the encoder wheel when the insert 14 is forcefully fitted onto the bearing unit. With this aim in view, it is also preferable that, in this kind of arrangement, the axial dimension of the annular seat in which the encoder wheel is housed should be greater than that of the encoder wheel itself in such a way as to leave, when the encoder wheel is assembled, an axial light L between the wheel and the surface 10b of the race which it faces. As described above, thrust B resulting from force fitting should not be exerted on the magnet; with regard to the arrangement illustrated in FIG. 4, the thrust should be exerted on the radial surface of the joining portion or zone 14c. The axial light L should preferably be equal to or less than 9.5 mm.

Other than permitting the achievement of the aims outlined in the introduction of the present description, all the arrangements described herein permit the elimination of conventional external sealing material which is usually fitted between the outer cylindrical surface of the outer race and the encoder wheel. In the example shown in FIG. 4, as stated, sealing is ensured by exploiting the extension 18a of the rubber lip of the sealing device 16; in the examples shown in FIGS. 2 and 3, sealing is guaranteed by the contact between the inner diameter zone 14e of the insert 14 and the outer radial part 18b of the lip 18.

Again with reference to FIGS. 2, 3 and 4, the insert 14 is extended radially inwardly towards the free end 20a of a non-rotating annular shield 20, also known as a centrifuge or by the English term of "flinger", forming part of the sealing device 16 and constituting the friction surface against which the sealing lip 18 reacts. When this is extended towards the centrifuge shield 20 it defines, together with the insert 14, a labyrinth seal which works to perfect the contact sealing described above. The free end 20a should preferably form a terminal edge bending radially outwardly to maximise the sealing action of the labyrinth seal and to improve the centrifugal effect.

As can be appreciated, in all the variations described above the thrust exerted in force fitting does not cause any considerable overall strain in the encoder wheel, in that any stress arising from this operation is entirely absorbed by the support insert 14. It can also be noted that the present invention permits the assembly of an encoder wheel which is contained within the axial dimensions of the bearing unit, defined by the axially inner side (on the right of the diagram) of the inner race 11. Finally, the insert of the present invention permits the reduction of the effect of sudden, extreme changes in temperature which encoder wheels located near vehicle brake devices are subject to.

What is claimed is:

1. A rolling bearing unit for a hub of a vehicle wheel, the bearing comprising:

a radially outer rotating race;

a radially inner stationary race;

a sealing device positioned between said races; and a measuring device for measuring the rotating speed of the outer race, said measuring device comprising an encoder wheel comprising a radially oriented annular disc of magnetized plastic or rubber material;

the bearing further comprising a metallic annular insert adapted for fixing the encoder wheel to the bearing outer race, said insert comprising:

an outer cylindrical portion that attaches via a force fit to an outer surface of the outer race;

a radial wall portion that forms an annular seat for accommodating the encoder wheel, said wall portion extending radially inwardly so as to co-operate with said sealing device to close the gap between said races; and a portion joining said outer cylindrical portion and said radial wall portion, said joining portion being a surface on which an axial thrust is applied for performing said force fitting;

wherein the surface on which said axial thrust is applied has an elbow portion joining said outer cylindrical portion to said radial wall portion.

2. The bearing unit of claim 1, wherein said encoder wheel is vulcanized in said seat of the insert.

3. The bearing unit of claim 1, wherein said annular seat has an axial dimension exceeding an axial dimension of the encoder wheel.

4. The bearing unit of claim 1, wherein at least a part of the radial wall portion abuts against a radially outwardly directed extension of a rubber lip of the sealing device.

5. The bearing unit of claim 1, wherein said radial wall portion covers an axially outer side of the encoder wheel.

6. The bearing unit of claim 5, wherein the encoder wheel is separately magnetized before being connected to the insert and elastically yieldable means are axially provided at an interface between the encoder wheel (13) and a surface against which the encoder wheel abuts, to rotationally lock the encoder wheel in relation to the outer race of the bearing unit.

7. The bearing unit of claim 6, wherein said elastically yieldable means are defined by at least one of bumps and grooves obtained in at least one of the encoder wheel, a radial wall of a metallic shield of the sealing device, or a radially outwardly directed extension of a rubber lip of the sealing device.

8. The bearing unit of claim 5, wherein at least a portion of an axially inner side of the encoder wheel abuts against a radially outwardly directed extension of a rubber lip of the sealing device.

9. The bearing unit of claim 5, wherein the insert comprises non-magnetic metal.

10. The bearing unit of claim 1, wherein said radial wall of the insert continues in a radially inner direction towards a non-rotating annular shield of the sealing unit to define, together with the sealing device, a labyrinth seal.

11. A rolling bearing unit for a hub of a vehicle wheel, the bearing comprising:
    a radially outer rotating race;
    a radially inner stationary race;
    a sealing device positioned between said races; and
    a measuring device for measuring the rotating speed of the outer race, said measuring device comprising an encoder wheel comprising a radially oriented annular disc of magnetized plastic or rubber material;
    the bearing further comprising a metallic annular insert adapted for fixing the encoder wheel to the bearing outer race, said insert comprising:
        an outer cylindrical portion that attaches via a force fit to an outer surface of the outer race;
        a radial wall portion that forms an annular seat for accommodating the encoder wheel, said wall portion extending radially inwardly so as to co-operate with said sealing device to close the gap between said races; and
        a portion joining said outer cylindrical portion and said radial wall portion, said joining portion being a surface on which an axial thrust is applied for performing said force fitting;
    wherein the encoder wheel is separately magnetized before being connected to the insert and wherein elastically yieldable means are axially provided at an interface between the encoder wheel and a surface against which the encoder wheel abuts, to rotationally lock the encoder wheel in relation to the outer race of the bearing unit.

12. A rolling bearing unit for a hub of a vehicle wheel, the bearing comprising:
    a radially outer rotating race;
    a radially inner stationary race;
    a sealing device positioned between said races; and
    a measuring device for measuring the rotating speed of the outer race, said measuring device comprising an encoder wheel comprising a radially oriented annular disc of magnetized plastic or rubber material;
    the bearing further comprising a metallic annular insert adapted for fixing the encoder wheel to the bearing outer race, said insert comprising:
        an outer cylindrical portion that attaches via a force fit to an outer surface of the outer race;
        a radial wall portion that forms an annular seat for accommodating the encoder wheel, said wall portion extending radially inwardly so as to co-operate with said sealing device to close the gap between said races; and
        a portion joining said outer cylindrical portion and said radial wall portion, said joining portion being a surface on which an axial thrust is applied for performing said force fitting;
    wherein the encoder wheel is separately magnetized before being connected to the insert and wherein elastically yieldable means are axially provided at an interface between the encoder wheel and a surface against which the encoder wheel abuts, to rotationally lock the encoder wheel in relation to the outer race of the bearing unit;
    wherein said elastically yieldable means are defined by at least one of bumps or grooves obtained in at least one of the encoder wheel, a radial wall of a metallic shield of the sealing device, or a radially outwardly directed extension of a rubber lip of the sealing device.

* * * * *